(12) United States Patent  (10) Patent No.: US 9,000,904 B2
Lichtenegger                 (45) Date of Patent:     Apr. 7, 2015

(54) TIRE PRESSURE MONITORING USING HALF DUPLEX TRANSPONDER FREQUENCY SHIFT

(71) Applicant: Texas Instruments Deutschland GmbH, Freising (DE)

(72) Inventor: Alfons Lichtenegger, Freising (DE)

(73) Assignee: Texas Instruments Deutschland GmbH, Freising (DE)

( * ) Notice: Subject to any disclaimer, the term of this patent is extended or adjusted under 35 U.S.C. 154(b) by 38 days.

(21) Appl. No.: 13/850,246

(22) Filed: Mar. 25, 2013

(65) Prior Publication Data

US 2014/0022069 A1    Jan. 23, 2014

Related U.S. Application Data

(60) Provisional application No. 61/616,248, filed on Mar. 27, 2012.

(51) Int. Cl.
*B60C 23/00* (2006.01)
*B60C 23/04* (2006.01)

(52) U.S. Cl.
CPC ......... *B60C 23/0433* (2013.01); *B60C 23/0449* (2013.01)

(58) Field of Classification Search
CPC ............ B60C 23/0408; B60C 23/0416; B60C 23/0425; B60C 23/0433; B60C 23/009; B60C 23/0449; G01L 17/00; G01M 17/02; G01K 11/06; G01K 1/024; G01K 3/04; G01K 7/01

USPC ................. 340/447, 442, 445, 438, 443–444, 340/870.01, 870.3, 870.31, 531, 539.1, 501, 340/505, 626

See application file for complete search history.

(56) References Cited

U.S. PATENT DOCUMENTS

| | | | | |
|---|---|---|---|---|
| 5,525,960 | A | * | 6/1996 | McCall et al. ................ 340/438 |
| 6,058,768 | A | * | 5/2000 | Huang ........................ 73/146.5 |
| 6,109,099 | A | * | 8/2000 | Kawai et al. ................. 73/146.5 |
| 6,369,712 | B2 | * | 4/2002 | Letkomiller et al. ....... 340/572.1 |
| 6,539,789 | B1 | * | 4/2003 | Kostka et al. .................. 73/146 |
| 8,289,144 | B2 | * | 10/2012 | Zhu et al. ....................... 340/447 |
| 2007/0013524 | A1 | * | 1/2007 | Ganz ........................... 340/572.7 |
| 2012/0153738 | A1 | * | 6/2012 | Karalis et al. ................. 307/104 |

\* cited by examiner

*Primary Examiner* — Daniel Previl

(74) *Attorney, Agent, or Firm* — William B. Kempler; Frank D. Cimino

(57) ABSTRACT

A tire pressure sensor has an RFID (radio frequency identification) device having a parallel resonant circuit including an inductor and a first capacitor for generating a first radio frequency (RF) signal for transmission to a reader circuit, and a second capacitor coupled across the parallel resonant circuit by a first switch in a first position and generating a second RF signal for transmission to the reader circuit. A capacitive pressure sensor is coupled across the parallel resonant circuit by the first switch in a second position for generating a third frequency RF signal for transmission to the reader, wherein a difference in frequency between the first and third RF signals is indicative of a pressure of a tire.

15 Claims, 3 Drawing Sheets

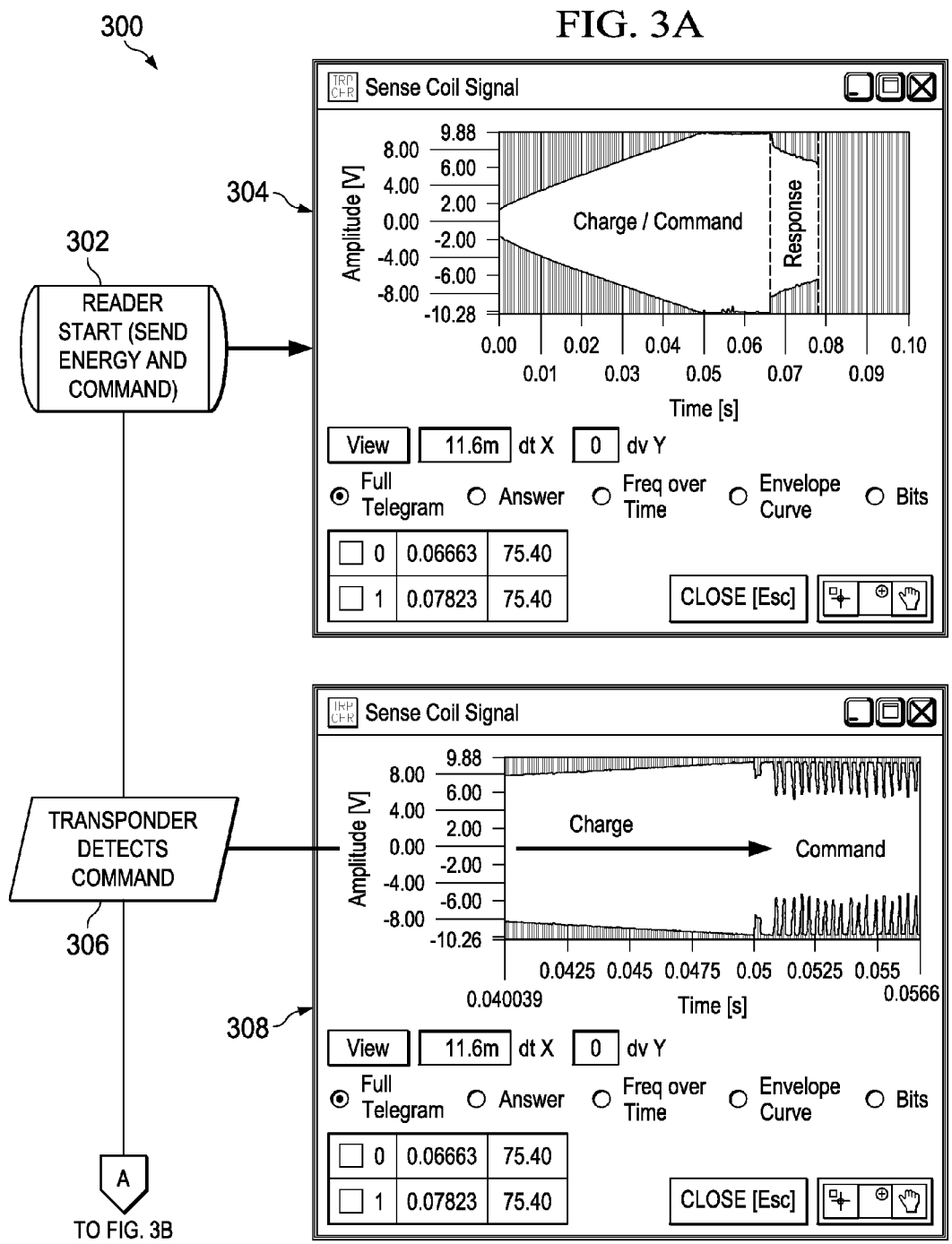

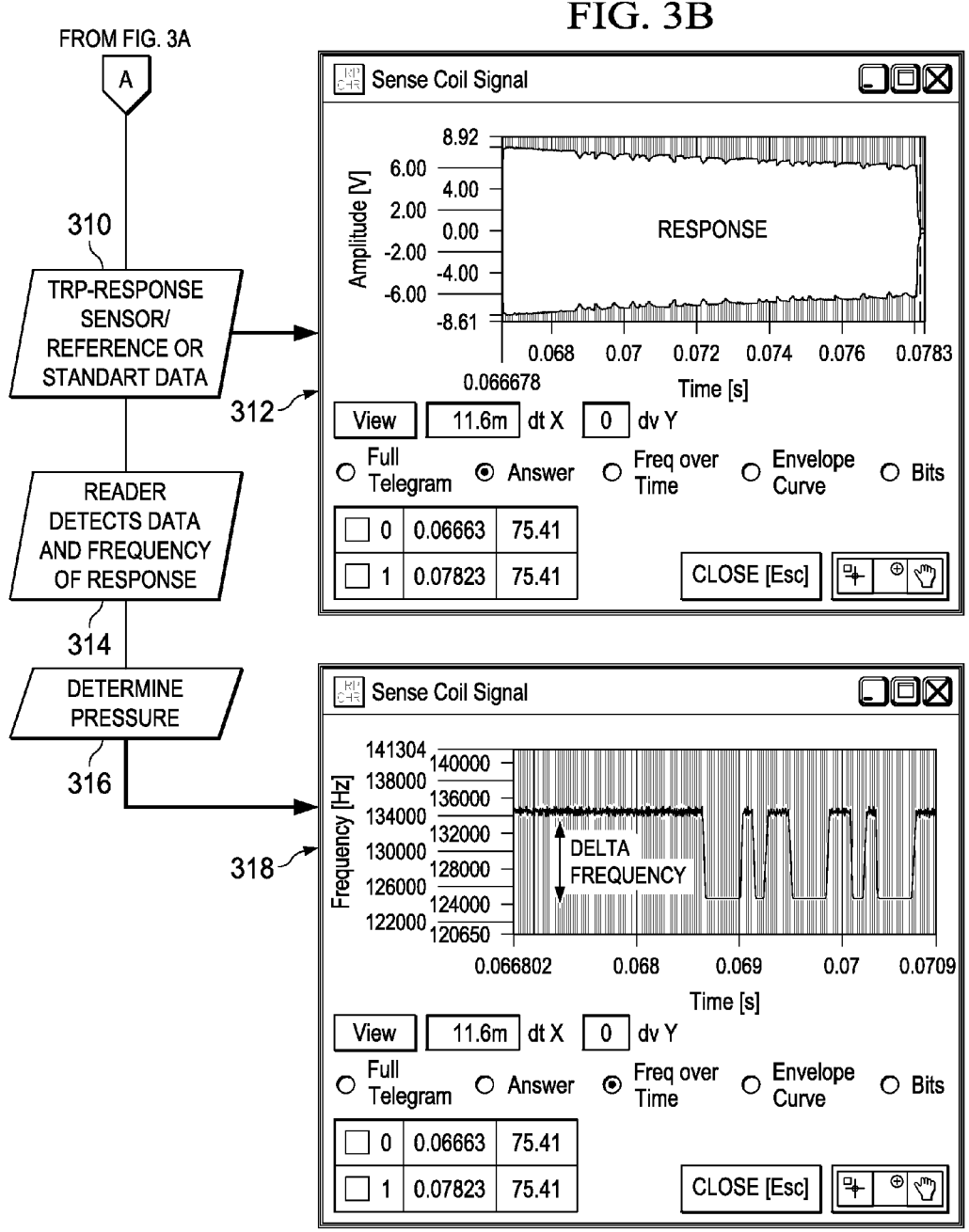

TIRE PRESSURE MONITORING USING HALF DUPLEX TRANSPONDER FREQUENCY SHIFT

CROSS-REFERENCE TO RELATED APPLICATIONS

This patent application claims priority from U.S. Provisional Application No. 61/616,248 filed Mar. 27, 2012, which is incorporated herein by reference in its entirety.

FIELD OF THE INVENTION

The invention relates generally to a tire pressure sensor and more specifically to a RFID tire pressure sensor.

BACKGROUND OF THE INVENTION

FIG. 1 shows a half duplex transponder utilizing two frequencies, as is known in the prior art, generally as 100. The transponder comprises a parallel resonant (tank) circuit consisting of inductor LR capacitor CR. A capacitor CL is coupled between the parallel resonant circuit and ground. A diode D1 is coupled across the tank circuit and a capacitor CL. One or more trimming capacitors CT1 . . . CTx are coupled across the diode D1. A modulation capacitor CM is connected across the diode D1 via transistor 102 which has its drain connected to ground.

Trimming capacitors CT1 through CTx may be placed in the circuit in order to trim the oscillating frequency of the resonant circuit to 134.2 kHz, for example. The transponder is passive and it is powered by the reader sending a RF signal, which is then rectified and stored as capacitor CL and used to operate the transponder. The transponder will acknowledge receipt of a query signal, utilizing the 134.2 kHz frequency. This frequency will also be used to modulate the transistor 102 to generate one state of a digital signal, for example, a digital zero. In order to generate a signal representative of a digital one, transistor 102 is turned on, thereby coupling modulation capacitor CM across the resonant tank circuit and changing the resonant frequency to 124.2 kHz, for example. The reader circuit, which transmits the initial signal, can then interpret the difference in frequency, here 10 kHz, to obtain the information transmitted by the transponder.

SUMMARY OF THE INVENTION

It is a general object of the invention to provide a RFID tire pressure sensor.

This and other objects and features are provided, in accordance with one aspect of the invention by a tire pressure sensor comprising an RFID (radio frequency identification) device having a parallel resonant circuit comprising an inductor and a first capacitor for generating a first radio frequency (RF) signal for transmission to a reader circuit, and a second capacitor coupled across the parallel resonant circuit by a first switch in a first position with generating a second RF signal for transmission to the reader circuit. A capacitive pressure sensor is coupled across the parallel resonant circuit by the first switch in a second position for generating a third frequency RF signal for transmission to the reader, wherein a difference in frequency between the first and third RF signals is indicative of a pressure of a tire.

Another aspect of the invention includes a method of measuring a tire pressure comprising transmitting from a reader circuit (RF) signal at a first frequency to a radio frequency identification (RFID) device to charge a capacitor therein and command a tire pressure sensor to measure pressure in a tire to which the sensor is attached. The first RF signal is transmitted from the RFID device to the reader circuit in response to a first state of a digital modulation signal. A third RF signal is transmitted from the RFID device in response to a second state of the digital signal, and a state of a capacitive pressure sensor coupled to a resonant circuit in response to the second state of the digital signal. A tire pressure is determined in response to a difference between the first and third RF signal frequencies.

A third aspect of the invention is provided by a tire pressure sensor using half duplex transponder frequency shift comprising a capacitive pressure sensor instead, or in addition to CM, connected to the IC output CM1. A capacitance change caused by pressure change varies the second frequency to generate a third frequency. The sensor being calibrated at certain pressure points, measuring the first and third RF signals transmitted from the RFID device in response to a second state of the digital signal, and a state of a capacitive pressure sensor coupled to a resonant circuit in response to the second state of the digital signal. A tire pressure is determined in response to a difference between the first and third RF signal frequencies.

BRIEF DESCRIPTION OF DRAWINGS

Further aspects of the invention will appear from the appending claims and from the following detailed description given with reference to the appending drawings.

FIGS. 3A and 3B are a flow chart with illustrations of the generated waveforms for a method of measuring tire pressure.

DETAILED DESCRIPTION OF EXAMPLE EMBODIMENTS

Figure 1:
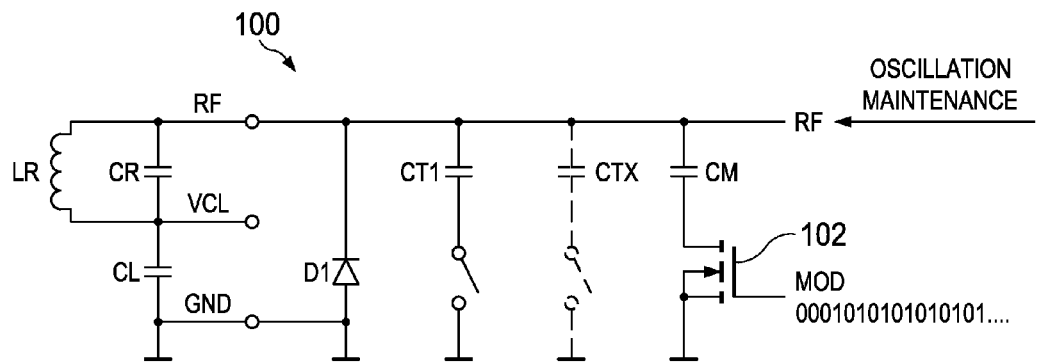
FIG. 1 is a schematic of a known RFID device.
Figure 2:
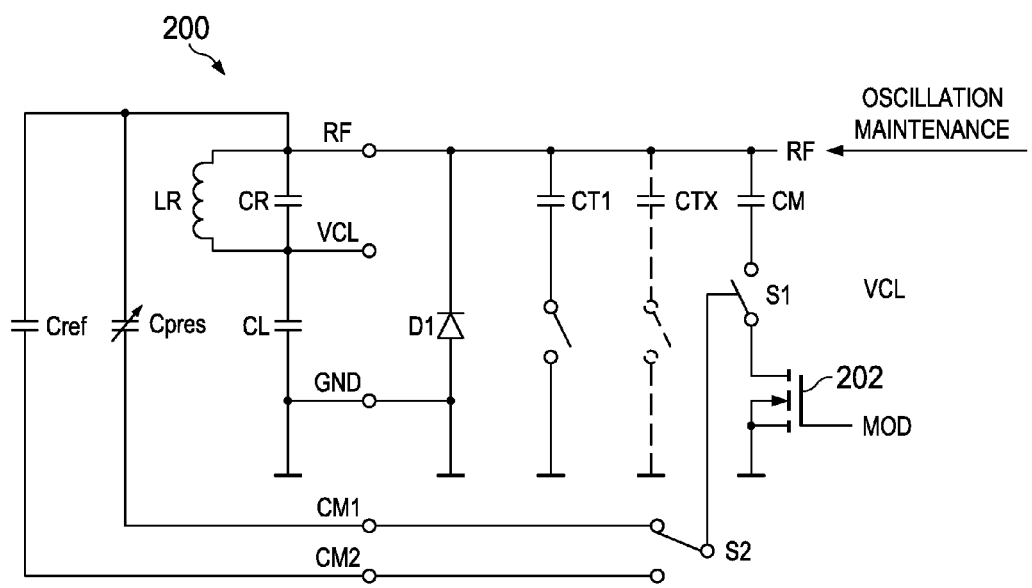
FIG. 2 is a schematic of an RFID device modified to measure tire pressure.

FIG. 2 shows a passive RFID transponder modified for measuring tire pressure, generally as 200. In addition to the circuit elements shown in FIG. 1, the modulation transistor 202 is connected by a switch 51, either to the modulation capacitor CM or through a second switch S2 to a capacitive pressure sensor. The capacitive pressure sensor may be external to the transponder circuit and may be mounted in a vehicle tire, for example. In this embodiment, when the digital one signal is applied to the modulation input of transistor 202, of the parallel resonant tank circuit will be altered by the capacitance of the capacitive pressure sensor Cpres. The capacitance of the pressure sensor varies with the pressure applied to the sensor. For example, a high-pressure may result in a higher capacitance in the capacitive pressure sensor which results in oscillation of the parallel resonant tank circuit at 118 kHz, for example. A low-pressure may result in a lower capacitance in the capacitive pressure sensor which results in an oscillation frequency of 128 kHz, for example.

The reader circuit (not shown), which circuits are well known in the art, measures the frequency difference between the frequency transmitted with a digital zero applied to the modulation input (gate) of transistor 202 and the for the frequency transmitted when a digital one is applied to the gate. For example, the frequency with a digital zero applied to the gate of transistor 202 may result in a frequency of 134.2 kHz whereas when a digital one is applied to the gate of transistor 202 and the switches S1 and S2 couple the pressure sensor into the circuit, the oscillation frequency may be 118 kHz. This results in a frequency difference of 16.2 kHz, which can be used to calculate the actual pressure in the tire.

In order to improve the accuracy of the measurement, and optional reference capacitor is shown in FIG. 2 as Cref. In order to calibrate the tire pressure measurement, the switch S2 is switched to a second position in which the capacitive tire pressure sensor, Cpres is omitted from the circuit and replaced by a reference capacitor Cref. Reference capacitor Cref is a fixed capacitor of known capacitance. When transistor 202 is modulated by a digital one signal, the frequency of the resonant tank circuit will be modified by the capacitor Cref and not by the pressure transducer Cpres. Thus, a known frequency should be transmitted. Any difference between the known frequency and the frequency that is transmitted can be utilized to calibrate the tire pressure measurement.

The pressure measurement can also be calibrated at certain pressure points by measuring the first and second frequency transmitted by the transponder. During the calibration, first frequency will be the same or similar for all pressure points. During application of the capacitance for a digital one, the frequency changes and the pressure can be calculated from calibration values which may then be stored in the transponder memory. If the low bit frequency changes due to external or internal influences, the change can be used to correct the error in the digital one frequency.

FIG. 3 illustrates a process for determining the pressure of a tire, for example, generally as 300. At step 304, the reader circuit sends a signal at the digital zero frequency to charge the capacitor CL so that there is sufficient energy for the transponder to operate. The transponder responds to the signal at this frequency indicating that the signal has been received. These signals illustrated in block 304, for example. At block 306, the transponder detects a command, as illustrated in block 308, for example. In block 310, the transponder responds with data which may include data relating to the pressure of the tire, for example. This is illustrated in block 312. At block 314, the reader detects data and the frequency of the response. At block 316 the reader determines the pressure from the difference in frequency between the digital one frequency and the digital zero frequency, as illustrated in block 318.

Although the invention has been described in detail, it should be understood that various changes, substitutions and alterations can be made thereto without departing from the spirit and scope of the invention as defined by the appended claims. For example, if only the tire pressure data is to be transmitted from the transponder to the reader circuit, the second frequency and third frequency may coincide.

The invention claimed is:

1. A tire pressure sensor comprising:
an RFID (radiofrequency identification) device having a parallel resonant circuit comprising an inductor and a first capacitor for generating a first radiofrequency (RF) signal for transmission to a reader circuit, and a second capacitor coupled across the parallel resonant circuit by a first switch in a first position for generating a second RF signal for transmission to the reader circuit;
a capacitive pressure sensor being coupled across the parallel resonant circuit by the first switch in a second position for generating a third frequency RF signal for transmission to the reader, wherein a difference in frequency between the first and third RF signals is indicative of a pressure of a tire.

2. The tire pressure sensor of claim 1, further comprising a modulation circuit coupled to the first switch for generating the first RF signal in response to a first state of a digital signal and for generating the second RF signal in response to a second state of the digital signal.

3. The tire pressure sensor of claim 2, wherein the first switch is in the second position and the modulation signal generates a first frequency RF signal in response to the first state of the digital signal and the third frequency RF signal in response to the second state of the digital signal.

4. The tire pressure sensor of claim 3, further comprising a known fixed capacitor coupled across the parallel resonant circuits by the first switch in a second position and a second switch in the second position for generating a predetermined frequency RF signal for transmission to the reader circuit for calibrating the response of the pressure sensor.

5. The tire pressure sensor or of claim 4, wherein the first RF signal frequency is 134 kHz, and the second RF signal frequency is 124.2 kHz.

6. The tire pressure sensor of claim 2, further comprising a known fixed capacitor coupled across the parallel resonant circuits by the first switch in a second position and a second switch in the second position for generating a predetermined frequency RF signal for transmission to the reader circuit for calibrating the response of the pressure sensor.

7. The tire pressure sensor of claim 1, further comprising a known fixed capacitor coupled across the parallel resonant circuit by the first switch in a second position and a second switch in the second position for generating a predetermined frequency RF signal for transmission to the reader circuit for calibrating the response of the pressure sensor.

8. A method of measuring a tire pressure comprising:
transmitting from a reader circuit a (RF) signal at a first frequency to a radio frequency identification (RFID) device to charge a capacitor therein and command a tire pressure sensor measure pressure in a tire to which the sensor is attached;
transmitting the first RF signal from the RFID device to the reader circuit in response to a first state of a digital modulation signal;
transmitting a second RF signal from the RFID device in response to a second state of the digital signal, and a state of a capacitive pressure sensor coupled to a resonant circuit in response to the second state of the digital signal; and
determining a tire pressure in response to a difference between the first and third RF signal frequencies.

9. The method of claim 8, further comprising transmitting data from the RFID device to the reader circuit in which the first frequency RF signal corresponds to a first state of the digital signal at a second frequency generated by fixed capacitance being coupled to the resonant circuit in response to the second state of the digital signal.

10. The method of claim 9, further comprising coupling a fixed calibration capacitance across the resonant circuit in response to a second state of the digital signal for calibrating the tire pressure sensor response.

11. The method of claim 8, further comprising coupling a fixed calibration capacitance across the resonant circuit in response to a second state of the digital signal for calibrating the tire pressure sensor response.

12. A tire pressure sensor using half duplex transponder frequency shift comprising:
a capacitive pressure sensor (Cpres) instead, or in addition to CM, connected to the IC output CM1;
capacitance change caused by pressure change varies the second frequency;
the capacitive pressure sensor being calibrated at certain pressure points, measuring the first and second frequency calibration at the first frequency being substantially the same for all pressure points;

application of the capacitance and High-bit frequency changes and the pressure is calculable out of the calibration values stored in the transponder memory.

13. The sensor of claim 12, wherein Low-bit frequency changes due to external or IC internal influence, the change can be used to correct the error of High-bit frequency.

14. The sensor of claim 13, comprising a second output (CM2), where a reference capacitor (Cref) can be connected, with a certain downlink command Cref will be used during uplink and resulting frequency can be used for calibration.

15. The sensor of claim 12, comprising a second output (CM2), where a Reference Capacitor (Cref) can be connected, with a certain downlink command Cref will be used during uplink and resulting frequency can be used for calibration.

\* \* \* \* \*